(12) United States Patent
Davis et al.

(10) Patent No.: US 8,259,416 B1
(45) Date of Patent: Sep. 4, 2012

(54) HEAD SUSPENSION HAVING VISCOELASTIC LOAD POINT

(75) Inventors: Michael W. Davis, Rockford, MN (US); Mohammed Kazemi, Hutchinson, MN (US); Mark G. Lowry, Minneapolis, MN (US); Alan D. Maki, Chaska, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 970 days.

(21) Appl. No.: 12/118,240

(22) Filed: May 9, 2008

(51) Int. Cl.
*G11B 5/48* (2006.01)
*G11B 21/16* (2006.01)

(52) U.S. Cl. .................................. 360/245.1; 360/245

(58) Field of Classification Search ..... 360/244.2–245.2
See application file for complete search history.

(56) References Cited

U.S. PATENT DOCUMENTS

| | | | |
|---|---|---|---|
| 3,968,336 A | 7/1976 | Johnson | |
| 4,167,765 A | 9/1979 | Watrous | |
| 4,853,811 A * | 8/1989 | Brooks et al. .............. | 360/234.7 |
| 4,974,633 A | 12/1990 | Hickey | |
| 4,975,795 A | 12/1990 | Spash | |
| 5,079,660 A | 1/1992 | Yumura et al. | |
| 5,321,568 A | 6/1994 | Hatam-Tabrizi | |
| 5,428,490 A | 6/1995 | Hagen | |
| 5,473,488 A | 12/1995 | Gustafson et al. | |
| 5,530,606 A | 6/1996 | Baasch et al. | |
| 5,608,590 A | 3/1997 | Ziegler et al. | |
| 5,796,554 A | 8/1998 | Berding et al. | |
| 6,078,470 A | 6/2000 | Danielson et al. | |
| 6,181,522 B1 | 1/2001 | Carlson | |
| 6,212,760 B1 | 4/2001 | Summers et al. | |
| 6,549,376 B1 * | 4/2003 | Scura et al. ................. | 360/245.3 |
| 6,751,062 B2 | 6/2004 | Kasajima et al. | |
| 6,765,761 B2 * | 7/2004 | Arya .......................... | 360/244.7 |
| 6,781,794 B2 | 8/2004 | Ohwe et al. | |
| 7,046,483 B2 | 5/2006 | Erpelding | |
| 7,050,267 B2 | 5/2006 | Koh et al. | |
| 7,072,144 B2 | 7/2006 | Arya | |
| 7,864,488 B1 * | 1/2011 | Pan ............................ | 360/245.1 |
| 2003/0210499 A1 * | 11/2003 | Arya .......................... | 360/234.6 |
| 2007/0293866 A1 | 12/2007 | Stoeckel et al. | |

FOREIGN PATENT DOCUMENTS

| | | |
|---|---|---|
| EP | 1 691 350 A1 | 8/2006 |
| JP | 6-215511 A | 8/1994 |
| JP | 11-339363 | 12/1999 |

* cited by examiner

*Primary Examiner* — Daniell L Negron
*Assistant Examiner* — Adam B Dravininkas
(74) *Attorney, Agent, or Firm* — Faegre Baker Daniels LLP

(57) ABSTRACT

A disk drive head suspension including a load beam having a load beam load point region and a flexure, attached to the load beam, having a flexure load point region. A mass of viscoelastic material is fixedly attached to both load beam load point region and flexure load point region to form a pinned load point. A method for manufacturing a disk drive head suspension of the type having a flexure with a flexure load point region on a load beam with a load beam load point region. The flexure load point region is spaced apart from the load beam load point region. A load point is formed by applying a mass of viscoelastic material to the load point region of at least one of the flexure and the load beam.

4 Claims, 6 Drawing Sheets

HEAD SUSPENSION HAVING VISCOELASTIC LOAD POINT

TECHNICAL FIELD

The present invention relates generally to head suspensions for use in dynamic storage devices such as rigid disk drives. More particularly, the present invention relates to a load point dimple in a head suspension.

BACKGROUND OF INVENTION

Head suspensions for supporting a head over a rotating disk in hard disk drives are well known. Such head suspensions typically comprise a load beam having a flexure or gimbal at its distal end. A head slider having a read/write transducer is mounted to the flexure. In operation, the rotating disk creates an air bearing on which the head slider floats. The head suspension provides a spring force counteracting the force generated by the air bearing to position the slider at a specified "fly height". The flexure is sufficiently compliant to allow the slider to pitch and roll in response to fluctuations in the air bearing created by variations in the surface of the rotating disk. In this manner, the head slider is supported and can be positioned over the disk by an actuator assembly driven by a voice coil motor to read or write information on the disk.

The use of a dimple, formed in a surface of the head suspension, is also well known. Dimples are used to transfer the spring force generated by the head suspension to the slider and to provide a point about which the slider can move or gimbal in pitch and roll directions at the fly height. Such dimples are commonly referred to as "load point dimples" or "load points" and can be formed in a load point region or "tongue" of the flexure to engage the load beam. Alternately, load point dimples can be formed in a load point region of the load beam and engage the flexure. Since load beams and flexures are typically manufactured from stainless steel, the formed load point is also stainless steel and therefore provides a hard link between the flexure and the load beam.

Load point dimples are typically formed by forming or etching processes or by fixing a spherical ball between the flexure and load beam. Examples of such load point structures are shown in U.S. Pat. Nos. 4,167,765 to Watrous; 5,428,490 to Hagen; and 6,181,522 to Carlson. Load points such as those described in the above references readily transfer undesirable vibration to the slider during drive operation. Undesirable vibration energy caused from excitation of the voice coil motor or "windage" from the rotating disk can also be transferred through the head suspension to the slider via the load point.

There is a continuing need for improved load points in head suspensions. Specifically, there is a need for a load point and related manufacturing processes that can minimize the amount of vibration energy that is transferred to the slider. To be commercially viable, any such load point should be capable of being efficiently manufactured.

SUMMARY OF THE INVENTION

The present invention is a disk drive head suspension having a load beam and a flexure on the load beam. The load beam has a load beam load point region and the flexure has a flexure load point region. A load point is fixedly engaged to and extends from at least one of the load beam load point region and the flexure load point region. The load point has a contact region substantially consisting of viscoelastic material that is engaged with the other of the load beam load point region and the flexure load point region.

DETAILED DESCRIPTION OF THE INVENTION

Figure 1:
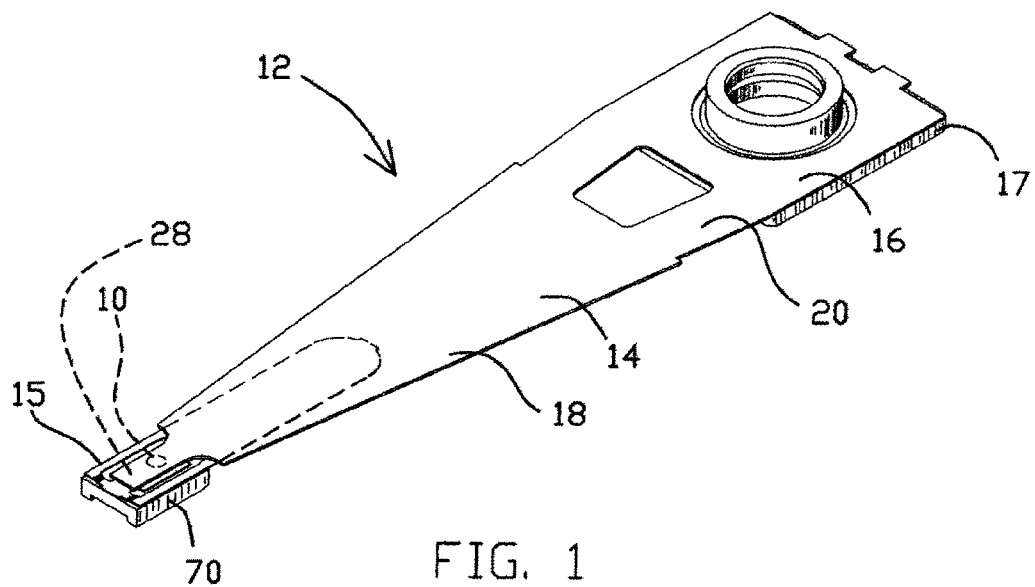
FIG. 1 is an isometric view of head suspension assembly having a load point in accordance with the present invention.

FIG. 1 is an illustration of a head suspension 12 including a load point 10 in accordance with one embodiment of the present invention. As shown, suspension 12 includes a stainless steel load beam 14 with a flexure 15 welded or otherwise attached to the load beam. Load beams such as 14 are well known and commercially available. Load beam 14 includes a mounting region 16 at its proximal end, a relatively rigid region 18, a load beam load point region 28 and a spring region 20 between the mounting and rigid regions. A base plate 17 is welded to the mounting region 16. The flexure 15 is configured to have a slider 70 adhesively bonded or otherwise mounted on the slider mounting region 21 (shown in FIG. 2).

Figure 2:
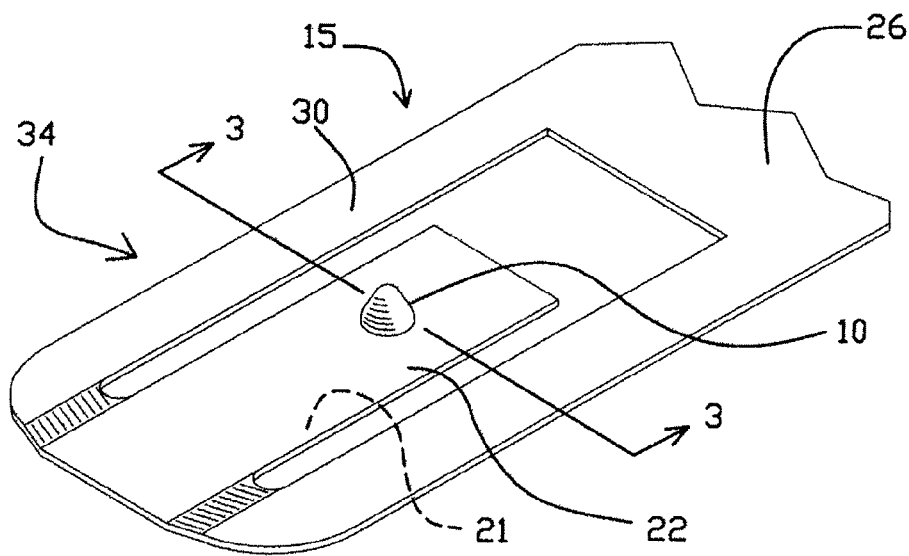
FIG. 2 is a fragmentary isometric view of the flexure of the head suspension shown in FIG. 1.
Figure 3:
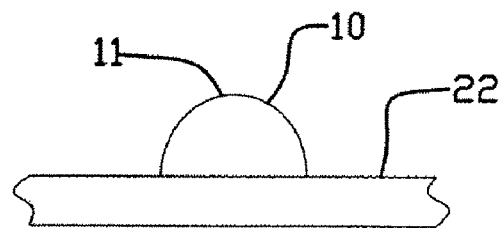
FIG. 3 is a detailed cross-sectional view, taken along line 3-3, of the load point shown in FIG. 2.

FIG. 2 shows the distal end of flexure 15 in accordance with the present invention. Flexure 15 includes a mounting region 26 and gimbal region 34. The mounting region 26 is configured to be attached to the rigid region 18 of the load beam. The gimbal region 34 includes flexure load point region 22, load point 10, spring arms 30, and slider mounting region 21. Load point 10 transfers the spring load from the suspension to the slider, provides a point about which the slider gimbals and provides a soft link between the flexure and load beam and serves to isolate vibration propagating from the load beam to the gimbal. In one embodiment, load point 10 is a mass of viscoelastic damping adhesive such as JDC MP65 from JDC Incorporated, Mount Juliet, Tenn. Other materials having vibration isolation properties such as thermoplastics, thermosets, rubbers and ionomers are also contemplated for load point 10. Examples of thermoplastics that can be used to form load point 10 include but are not limited to polyacrylates, polycarbonates, polyetherimides, polyesters, polysulfones, polystyrenes, acrylonitrile butadiene styrene block copolymers, polypropylenes, acetal polymers, polyvinyl acetyl polymers, polyamides, polyvinyl chlorides, polyethylenes, polyurethanes, Ethylene-Vinyl Acetate, polyether block amides, thermoplastic vulcanates, thermoplastic elastomers, styrenic elastomers and combinations thereof. Examples of rubbers that can be used to form load point 10 include but are not limited to urethane rubbers, silicone rubbers, nitrile rubbers, butyl rubbers, Synthetic rubber, acrylic rubbers, natural rubbers, Chloroprene rubber, Fluoroelastomers, Perfluoroelastomers, EPDM, styrene-butadiene rubbers, polyesters, polyurethanes, polyamides, ethylene-vinyl acetate copolymers, and epoxy-acrylate interpenetrating networks FIG. 3 is a cross-sectional view of load point 10 taken along line 3-3 in FIG. 2. As shown, load point 10 is fixedly engaged with flexure load point region 22 and includes contact region 11 for releasably engaging load beam load point region 28 (i.e. the load point is not bonded to the load beam load point region). The illustrated embodiment of load point 10 has a generally circular or cylindrical shape with a generally domed contact region 11. Other embodiments of load point 10, not shown, include tear-drop, frustro conical, cubical or other geometric shapes. Load point 10 has a diameter of approximately 0.3 mm to 0.6 mm and a height of approximately 0.025 mm to 0.100 mm in one embodiment although other embodiments can be larger or smaller. Load point 10 can be a viscoelastic material having a loss factor of 1 to 10 in the operating frequency range of 0 to 40,000 Hz and the operating temperature range of −40 to 80 degrees C. Although lower loss factors can be used, a minimum loss factor of 0.1 to 1 within the above frequency and temperature ranges is also contemplated.

Figure 4:
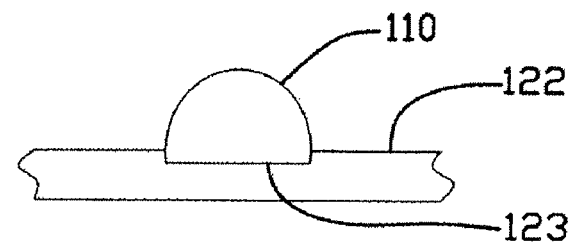
FIG. 4 is a detailed cross-sectional view of a flexure and load point in accordance with another embodiment of the present invention.

FIG. 4 shows a load point 110 in accordance with another embodiment of the invention. In this embodiment, flexure load point region 122 includes pocket 123. Pocket 123 serves to aid in locating load point 110 and can be formed by known methods such as by partial etching, laser ablation, mechanical forming or punching. Load point 110 can utilize the same material and have similar size and shape to load point 10 but can have other sizes, dimensions and geometric shapes as well. As shown, pocket 123 has a diameter of approximately 0.3 mm to 0.6 mm although other embodiments can be larger or smaller. Pocket 123 can be circular, rectangular, triangular or other geometric shape and is approximately 0.0025 mm-0.010 mm deep. In some embodiments, pocket 123 is no deeper than approximately 50% of the material thickness of load point region 122.

Figure 5:
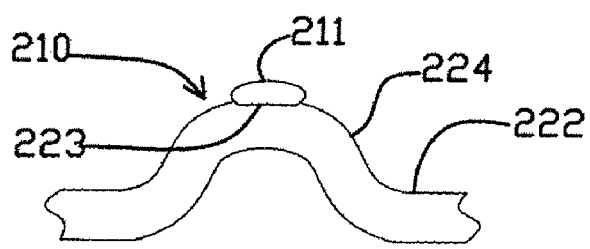
FIG. 5 is a detailed cross-sectional view of a flexure and load point in accordance with another embodiment of the present invention.

FIG. 5 shows a flexure load point region 222 having a load point structure 210 in accordance with an alternate embodiment of the invention. Load point structure 210 includes protruded area 224 and viscoelastic contact region 211. As shown, protruded area 224 is a formed, generally hemispherical, shape as is known in the art. Alternately, protruded area 224 may be cylindrical, frustro conical, rectangular or other geometric shape and may be formed by etching, stamping, plating or other methods. As shown, protruded area 224 is approximately 0.25 mm-0.90 mm in diameter although other embodiments can be larger or smaller. Protruded area 224 further includes pocket 223, similar to pocket 123 in FIG. 4, to aid in locating the viscoelastic material forming contact region 211. Pocket 223, as shown, is approximately 0.125 mm-0.50 mm in diameter although other embodiments can be larger or smaller. Viscoelastic contact region 211 can be the same material as load point 10 and has a height sufficient to extend above protruded area 224. In one example, pocket 223 is approximately 0.005 mm deep and contact region 11 has a height of approximately 0.01 mm. Other embodiments can be larger or smaller.

Figure 6:
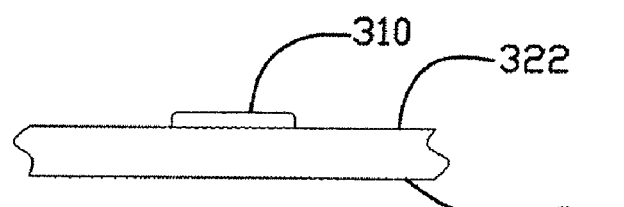
FIG. 6 is a detailed cross-sectional view of a flexure and load point in accordance with another embodiment of the present invention.

FIG. 6 shows load point 310 in accordance with yet another embodiment the invention. Load point 310 is a generally flat surface or adhesive damping 'sheet' having a generally rectangular, circular or other geometric shape. In the embodiment shown, load point 310 has a rectangular shape having sides of approximately 0.3 mm to 0.6 mm and a height of approximately 0.010 mm to 0.025 mm although other embodiments can be larger or smaller.

Figure 7:
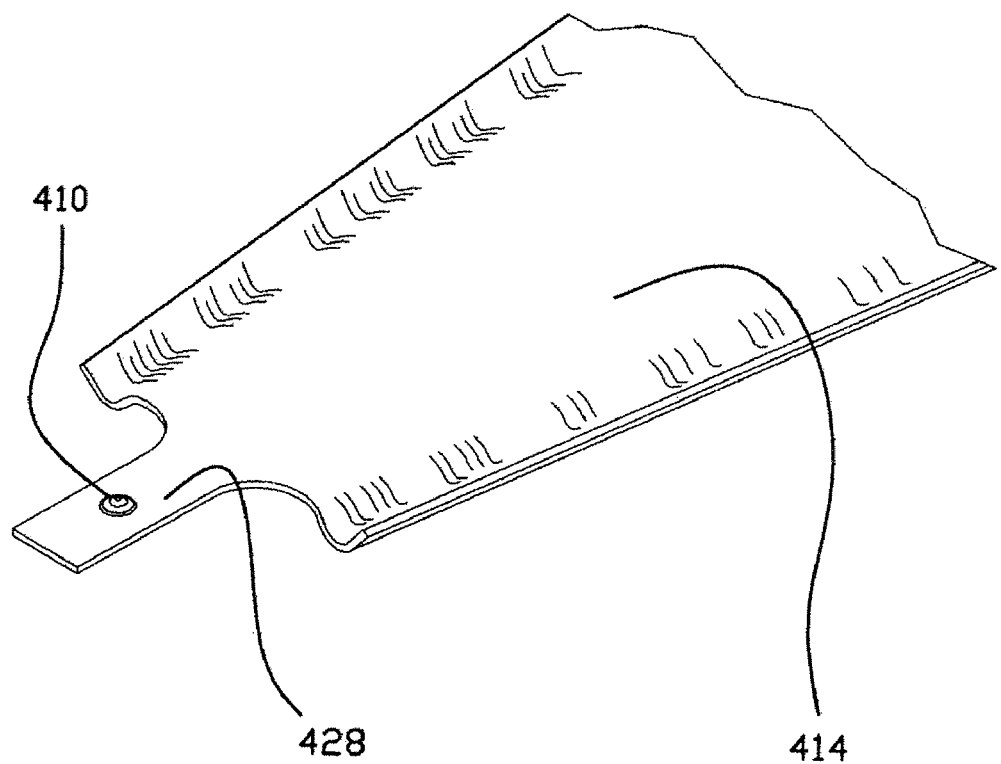
FIG. 7 is a fragmentary isometric view of a load beam in accordance with another embodiment of the present invention.

FIG. 7 shows a load point 410 located and fixedly engaged on load beam load point region 428 of load beam 414. In operation, load point 410 will releasably engage the flexure tongue (not shown). As shown, load point 410 is similar in size and shape and can utilize the same material as load point 10 but can also be configured similar to load points 110, 210 or 310 previously described.

Figure 8:
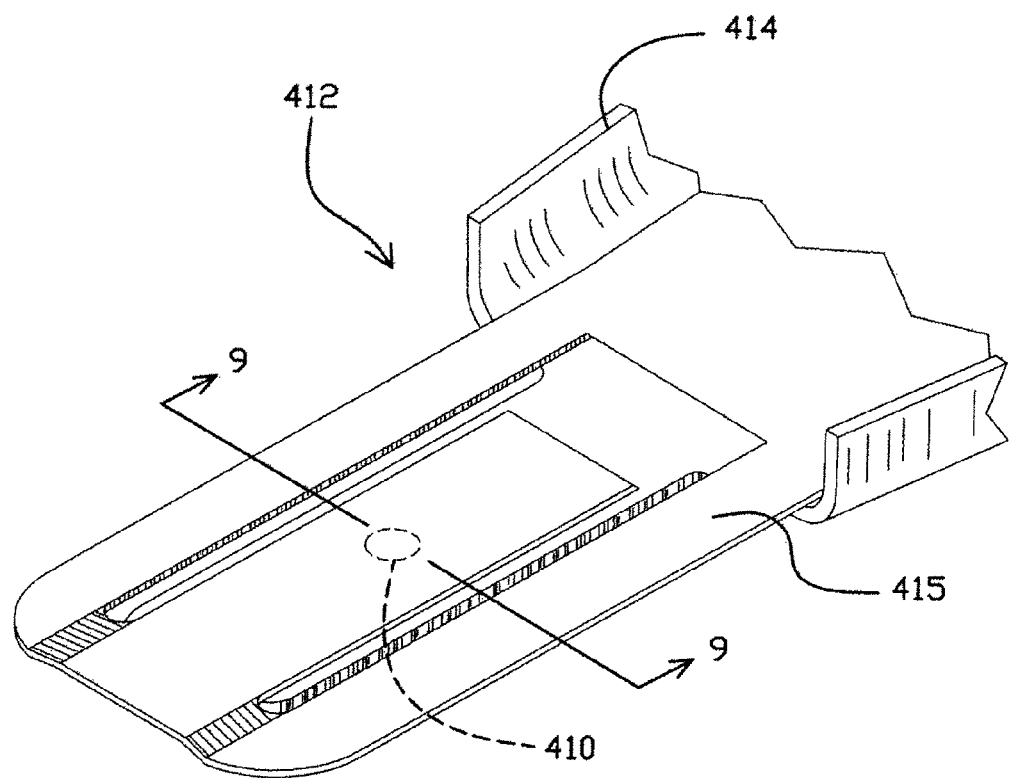
FIG. 8 is a fragmentary isometric view of a head suspension assembly (without slider) incorporating the load beam of FIG. 7.
Figure 9A:
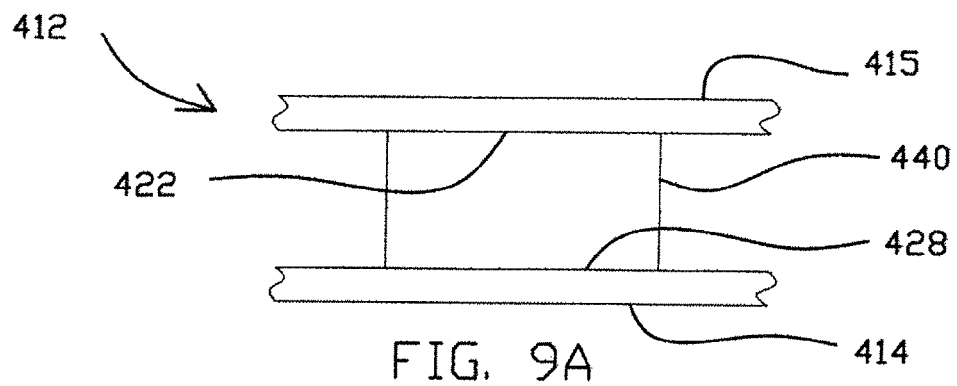
FIG. 9A-9D are detailed cross sections, taken along line 9-9 in FIG. 8, illustrating sequential steps of a process for manufacturing a load point in accordance with an embodiment of the present invention.
Figure 9B:
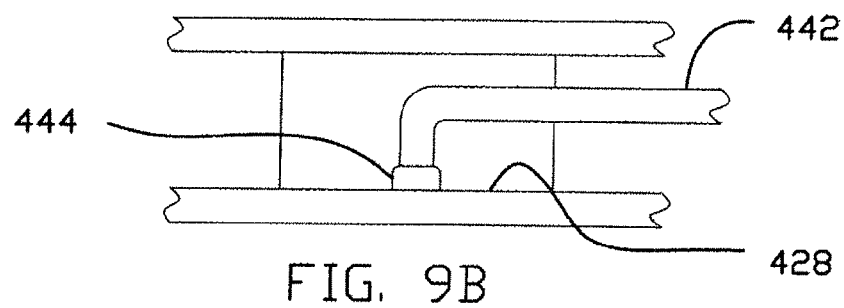
Figure 9C:
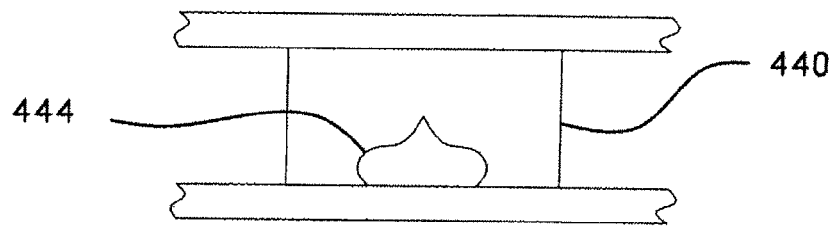
Figure 9D:
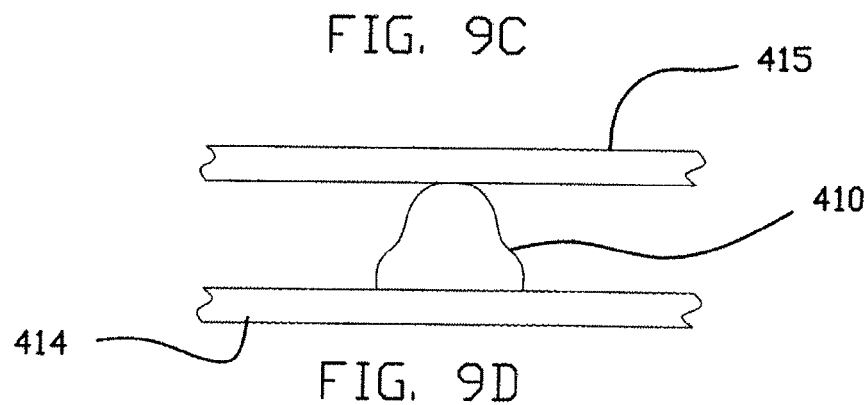

One method of manufacturing a suspension assembly 412 having a load point 410 in accordance with the present invention is described with reference to FIGS. 8 and 9. Suspension assemblies having load points 10, 110, 210 and 310 as previously described can be manufactured using similar methods. FIG. 8 shows the distal end of head suspension 412 having load beam 414, flexure 415 and load point 410. After locating, but prior to fixedly attaching, flexure 415 with load beam 414, spacer 440 is used to space flexure load point region 422 from load beam load point region 428. Dispensing system 442 applies a mass of viscoelastic adhesive material 444 in fluid or gel form to load point region 428. Adhesive dispensing system 442 is removed and material 444 is cured or otherwise solidified by thermal, ultraviolet or other processing to fixedly engage load point 410 with load beam load point region 428. As shown in FIG. 9C, material 444 may have a 'tear drop' shaped resulting from the dispensing process although other shapes are also contemplated. Spacer 440 is then removed and flexure 415 is welded or otherwise attached to load beam 414 as is known in the art. The above processes can also be performed after the flexure 415 is welded or otherwise attached to load beam 414.

Another method for manufacturing the load point structures of the present invention is to apply viscoelastic material to the load point regions of the flexure or load beam prior to the flexure-to-load beam assembly process. In this process, the viscoelastic material is applied in batch form using screen printing, gravure printing, pad printing, pin transfer, fluid dispensing and molding processes or the like. The viscoelastic material may be fully cured after application or partially cured after application and followed with a secondary cure after the flexure-to-load beam assembly process.

Sheet-form or flat load points 310, as illustrated in FIG. 6, may also be applied using 'kiss-cut' in combination with pick-and-place processes as are generally known. In one example of a 'kiss-cut' process, the viscoelastic sheet includes a second, sufficiently rigid, layer (not shown) to enable the punch and placement processes. Viscoelastic load point 310 is punched from a sheet of viscoelastic material and fixedly engaged to one of the load beam load point region (not shown) and flexure load point region 322. The second layer may be a 'green' polymer or other adhesive that is cured after flexure 315 is attached to load beam (not shown) to fixedly engage load point 310 to the other of the flexure load point region 322 and load beam load point region creating a 'pinned' load point as described with respect to FIG. 10 below. Alternately, the second layer is a constraint layer that does not go through a curing process after attaching flexure 315 to load beam. In addition, load point 310 may include multiple layers of viscoelastic material. An example of a structure of this type would be a load point 310 having two different viscoelastic materials configured into three layers. The multilayer structure can, for example, include 0.7-mil JDC MD15×0.7-mil JDC MP65×0.7-mil JDC MD15.

Figure 10:
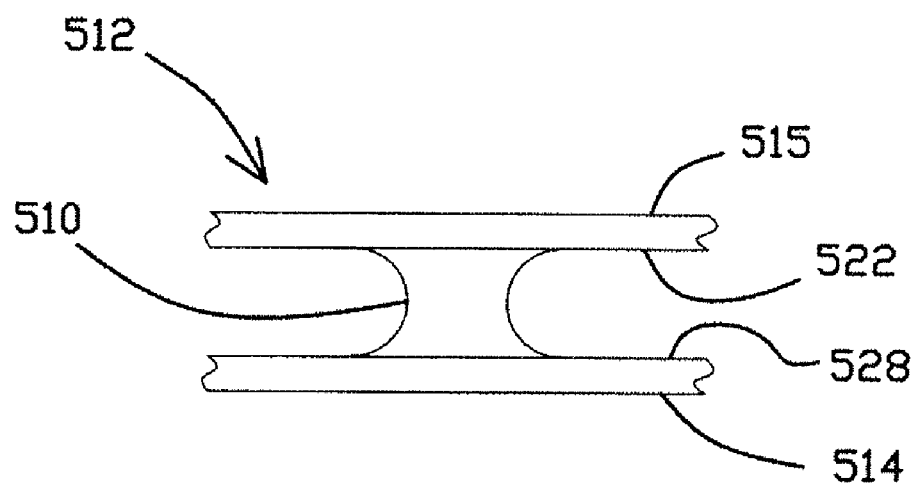
FIG. 10 is a detailed cross-sectional view of a load point structure in accordance with another embodiment of the present invention.

A 'pinned' load point 510, as shown in FIG. 10, is fixedly engaged to both flexure load point region 522 and load beam load point region 528. The illustrated embodiment of 'pinned' load point 510 has a generally 'hour glass' shape although other shapes and configurations such as those described with respect to load points 10, 110, 210, 310 and 410 are also contemplated. In addition to minimizing the transfer of vibration energy to the slider, the 'pinned' load point 510 also helps to reduce the separation between the load beam 514 and flexure 515 during loading and unloading of the head suspension assembly 512 thereby reducing risk of damage to the head suspension assembly 512. Load point 510 can be manufactured in a manner similar to that described above in connection with FIG. 8 and FIG. 9. For example, the viscoelastic material of the load point can be partially cured prior to removing the spacer and then a final cure can be applied after the spacer is removed to fixedly engage or bond the viscoelastic material to both the load beam load point region and the flexure load point region.

The embodiments and methods of manufacture described above are examples only. Those skilled in the art will recognize that changes may be made in form and detail without departing from the spirit and scope of the invention.

What is claimed is:

1. A disk drive head suspension, including:
    a load beam having a load beam load point region;
    a flexure on the load beam and having a flexure load point region; and
    wherein at least one of the load beam load point region and the flexure load point region includes a planar surface; and
    a load point consisting of viscoelastic material fixedly engaged to and extending from the planar surface of at least one of the load beam load point region and flexure load point region and having a viscoelastic material contact region engaged with the other of the load beam load point region and flexure load point region.

2. The head suspension of claim 1 wherein the contact region is fixedly engaged with the other of the load beam load point region and flexure load point region.

3. The head suspension of claim 1 wherein the contact region is releasably engaged with the other of the load beam load point region and flexure load point region.

4. The head suspension of claim 1 wherein the planar surface of the at least one of the load beam load point region and flexure load point region includes a pocket.

* * * * *